No. 676,562. Patented June 18, 1901.
J. H. LANGGAARD.
ELASTIC WHEEL TIRE.
(Application filed Apr. 16, 1901.)

(No Model.)

WITNESSES:
Isabella Haldron.

INVENTOR
Jens Henri Langgaard
BY Richards & Co
ATTORNEYS

UNITED STATES PATENT OFFICE.

JENS H. LANGGAARD, OF LIVERPOOL, ENGLAND.

ELASTIC WHEEL-TIRE.

SPECIFICATION forming part of Letters Patent No. 676,562, dated June 18, 1901.

Application filed April 16, 1901. Serial No. 56,168. (No model.)

*To all whom it may concern:*

Be it known that I, JENS HENRI LANGGAARD, a subject of the King of Great Britain, residing at 99 Tweed street, Liverpool, in the county of Lancaster, England, have invented new and useful Improvements in Elastic Wheel-Tires, of which the following is a specification.

This invention relates to elastic or cushion tires for road-vehicles—such as light motor-carriages, velocipedes, and the like—and is embodied in an improved manufacture of tire in which there is a core made of specially prepared and treated cork inclosed in an envelop of india-rubber and canvas by which also the tire so made is secured to the felly of the wheel.

The object of this invention is to make a light, durable, and cheap form of elastic or cushion tire.

According to this invention the cork is specially treated in order to make it more durable and to increase its resiliency without appreciably increasing the weight. The treatment consists in first removing the moisture from the cork by drying it with heat and then soaking the cork in pieces approximating in size those of the finished pieces of which the core of the tire is built up in raw linseed-oil until the pores and interstices of the cork are filled with it or until the cork is saturated with the oil. Afterward the cork is soaked in a watery solution of alum and permanganate of potash with a view to rendering the linseed-oil more viscous and the cork tougher and more durable. In order to remove superficial grease, I may afterward dip the cork pieces in a diluted solution of sulfuric acid.

The soaking of the cork pieces in linseed-oil and in the alum and permanganate of potash takes some considerable time—say twelve to twenty days in the ordinary way—but I may facilitate this by means of suitable apparatus—such, for instance, as a sealed vessel having an air-tight door and suitable valves, into which the cork pieces are placed, from which vessel the air can be exhausted and the liquids afterward introduced.

The relative proportions of the alum and permanganate of potash which I find suitable are to a pint of water two ounces of alum and one ounce of the permanganate.

The annexed sheet of drawings illustrates the construction of a tire embodying my invention.

Figure 1:
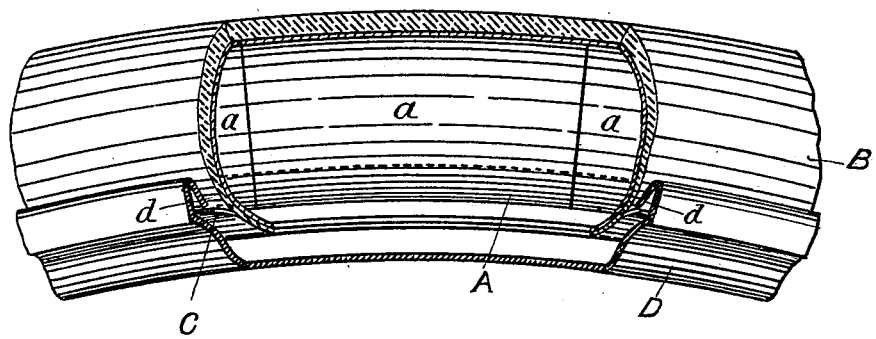
Figure 2:
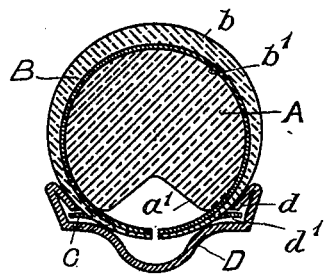

Figure 1 represents a longitudinal view, partly in section; and Fig. 2, a cross-section.

A represents the cork core; B, the cover which forms also the tread; C, the attachment, and D the felly.

The cork for the core is first dried over a charcoal fire, say, and is then formed to the desired shape and afterward treated in accordance with my invention; but I may equally well treat it first and afterward form it to the shape required. I form the core of the tire from solid pieces of cork in the form of segments of circles, such as $a$, Figs. 1 and 2, and of the section desired. Each segment $a$ may be grooved longitudinally, as shown at $a'$. The cork core A is inclosed by a cover B, consisting of an india-rubber tread $b$, having a lining of canvas $b'$. The cover is used to secure the core to the felly D and may be fixed in any ordinary known way. For instance, the felly is formed with turned-in edges $d$, as shown, and the cover is provided with segmental metal strips $d'$, secured to its lower sides or bottom and projecting outward, so as to engage the said edges $d$. The cover D may be slit longitudinally along the base of the tire, to the edges or margins of which the segmental strips $d'$ are secured.

What I claim as my invention, and desire to secure by Letters Patent, is—

1. An elastic wheel-tire composed of an annular sheath of india-rubber and canvas and a core of solid cork segments, said segments being first saturated with linseed-oil and afterward immersed in a saturated solution of alum and permanganate of potash substantially as set forth.

2. The method of treating cork for forming the cores of elastic wheel-tires, which consists in first evaporating the moisture in the cork by heat, then saturating the cork in raw linseed-oil and afterward immersing it in a bath of alum and permanganate of potash, substantially as and for the purpose set forth.

3. The combination of a wheel-felly externally grooved, an annular sheath of india-rubber and canvas having an opening along its internal periphery and fixed in the said grooved felly, and a core of solid cork segments packed closely in the said sheath, said cork segments being first dried, then saturated with linseed-oil and afterward immersed in a saturated solution of alum and permanganate of potash, substantially as set forth.

In testimony whereof I have signed my name to this specification in the presence of two subscribing witnesses.

J. H. LANGGAARD.

Witnesses:
R. J. URQUHART,
WM. H. BROAD.